(12) United States Patent
Yoshida

(10) Patent No.: US 7,151,616 B2
(45) Date of Patent: Dec. 19, 2006

(54) FACSIMILE APPARATUS, CONTROL METHOD OF FACSIMILE APPARATUS, AND COMPUTER-READABLE MEMORY MEDIUM STORING CONTROL PROGRAM FOR FACSIMILE APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 837 days.

(21) Appl. No.: 09/884,064

(22) Filed: Jun. 20, 2001

(65) Prior Publication Data

US 2003/0095297 A1 May 22, 2003

(30) Foreign Application Priority Data

Jun. 22, 2000 (JP) .............................. 2000-187093

(51) Int. Cl.
*G06F 3/12* (2006.01)
(52) U.S. Cl. ...................... 358/1.15; 358/400; 358/1.9; 358/426.02; 358/468; 358/438; 358/1.13; 358/498; 399/374
(58) Field of Classification Search ................ 358/401, 358/1.15, 1.16, 400, 1.9, 426.02, 434, 435, 358/436, 468, 474, 438, 439, 498, 440, 1.13; 347/103; 399/364, 374, 45, 82; 709/206
See application file for complete search history.

(56) References Cited

U.S. PATENT DOCUMENTS

| | | | | |
|---|---|---|---|---|
| 5,282,050 A | * | 1/1994 | Ishizuka et al. | ............ 358/400 |
| 5,289,290 A | * | 2/1994 | Suzuki et al. | ................ 358/440 |
| 5,408,340 A | * | 4/1995 | Edamura | ..................... 358/468 |
| 5,559,721 A | * | 9/1996 | Ishii | ............................ 709/206 |
| 5,715,071 A | * | 2/1998 | Takashimizu et al. | ...... 358/498 |
| 5,815,289 A | * | 9/1998 | Yoshida et al. | ............. 358/468 |
| 6,148,164 A | * | 11/2000 | Shima | ......................... 399/82 |
| 6,160,640 A | * | 12/2000 | Ohmori | ....................... 358/474 |
| 6,353,717 B1 | * | 3/2002 | Suzuki | ........................ 399/45 |
| 6,433,892 B1 | | 8/2002 | Yoshida | |
| 6,441,925 B1 | | 8/2002 | Yoshida | |
| 6,447,113 B1 | * | 9/2002 | Silverbrook et al. | ......... 347/103 |

(Continued)

FOREIGN PATENT DOCUMENTS

JP 06-319031 11/1994

(Continued)

*Primary Examiner*—Kimberly Williams
*Assistant Examiner*—Beniyam Menberu
(74) *Attorney, Agent, or Firm*—Fitzpatrick, Cella, Harper & Scinto

(57) ABSTRACT

Original sheets in which both-side image information and one-side image information exist mixedly can be efficiently and certainly transmitted without an erroneous operation. A CPU discriminates the presence or absence of effective image information in images on both sides of the original sheets read by a reading circuit. In a both-side transmitting mode, the CPU selectively determines whether a both-side transmitting procedure is used or a one-side transmitting procedure is used, for transmission of the image information for each transmission of one original sheet, in accordance with a result of the discrimination. In the both-side transmitting procedure, control information such as page number, information regarding the front or reverse side of the original sheet, and the like is transmitted to a receiver station, for each side of the original sheet. In the one-side transmitting procedure, the control information is not transmitted or a proper transmitting system is used (the page number to be allocated to the front side assuming that the original sheet is the both-side original sheet is used, or the like). When the number of one-side original sheets is small, all of the original sheets may be transmitted by using the both-side transmitting procedure.

12 Claims, 17 Drawing Sheets

U.S. PATENT DOCUMENTS

| | | |
|---|---|---|
| 6,449,063 B1 | 9/2002 | Yoshida et al. |
| 6,459,508 B1 | 10/2002 | Yoshida |
| 6,687,742 B1 * | 2/2004 | Iwazaki ................ 709/206 |
| 7,085,019 B1 * | 8/2006 | Yoshida et al. ............ 358/405 |
| 2004/0125394 A1 * | 7/2004 | Terao et al. ............ 358/1.13 |

FOREIGN PATENT DOCUMENTS

| | | |
|---|---|---|
| JP | 09-205511 | 8/1997 |
| JP | 409214681 A * | 8/1997 |
| JP | 09-252386 | 9/1997 |
| JP | 11017877 A * | 1/1999 |

* cited by examiner

FIG. 2

| BIT NO. | DIS/DTC | DCS |
|---|---|---|
| X | PRESENCE/ABSENCE OF BOTH-SIDE RECORDING FUNCTION (ALTERNATE MODE) | BOTH-SIDE TRANSMISSION (ALTERNATE MODE) |
| X+1 | PRESENCE/ABSENCE OF BOTH-SIDE RECORDING FUNCTION (CONTINUOUS MODE) | BOTH-SIDE TRANSMISSION (CONTINUOUS MODE) |

FIG. 3

| FLAG | ADDRESS | CONTROL | FCF | PC | BC | FC | LENGTH | PAGE NUMBER | PAGE INFORMATION | FCS | FLAG |
|---|---|---|---|---|---|---|---|---|---|---|---|

POST-MESSAGE SIG

{ PC, BC, FC: ONLY IN ECM }

FIG. 16

| SHEET NUMBER | FRONT | REVERSE |
|---|---|---|
| 1 (BOTH-SIDE ORIGINAL SHEET) | PN=1 | PN=2 |
| 2 (FRONT SIDE ORIGINAL SHEET) | PN=3 | ✕ |
| 3 (BOTH-SIDE ORIGINAL SHEET) | PN=5 | PN=6 |

FACSIMILE APPARATUS, CONTROL METHOD OF FACSIMILE APPARATUS, AND COMPUTER-READABLE MEMORY MEDIUM STORING CONTROL PROGRAM FOR FACSIMILE APPARATUS

BACKGROUND OF THE INVENTION

1. Field of the Invention

The invention relates to a facsimile apparatus having a both-side transmitting mode for reading images of originals in which both-side and one-side original sheets exist mixedly and transmitting them to a receiver, a control method of such an apparatus, and a computer-readable memory medium which stores a control program for such a facsimile apparatus.

2. Related Background Art

A facsimile apparatus specified in the ITU-T recommendation T.4, T.30, or the like fundamentally has a construction which accommodates the transmission of an image on a one-side original sheet. That is, the original on the transmitter side has information on one side and, on the receiver side, received image information is recorded onto one side of a recording paper.

However, in recent years, as consciousness of the need to save resources has been raised, among printers, copying apparatuses, and the like, the number of apparatuses having what is called a both-side recording system for recording onto the front and reverse sides of one sheet of paper has been increasing. In association with this development, recently, also in a facsimile apparatus, a hardware construction and a communicating procedure for reading images from a both-side original sheet that is, a sheet that has images on both sides) and transmitting the read images have been proposed.

For example, in the ITU-T recommendation T.30 or its tentative plan, a communicating procedure regarding both-side transmission has been proposed. According to a system proposed in this recommendation, image information itself on one (front or reverse) side of the original sheet is transmitted as a facsimile message, which is similar to that of an image of one page in the case of conventional one-side transmission, information such as page number and side is added to a post-message signal, and the resultant signal is transmitted. According to the both-side transmitting procedure, therefore, the amount of control information which is transmitted and received in the facsimile communicating procedure is larger than that in the case of the conventional one-side transmission, and the communicating time also slightly increases.

In the present ITU-T recommendation T.30 or its tentative plan, there is a problem in that no consideration is given to a mixture transmission, i.e., to a case where two-side and one-side original sheets exist mixedly. In such instance, when the both-side transmission is selected, and image information is present on the reverse side of only one of the plural original sheets, since the front and the reverse sides of all the original sheets are transmitted by the both-side procedure, the efficiency of transmission deteriorates.

Further, there is considered a case wherein, with respect to an instance where a mixture of originals having images on both sides and originals having images on only one sides present, the transmitting mode is changed during the communication so as to transmit the images of the two-side original sheet in the both-side mode and the images of the one-side original sheet in the one-side mode. However, at present, the recommendation does not define how to notify the reception side of the page number at which the transmission side changes the mode. Unless the reception side can be reliably and accurately notified of the point where the transmission change occurs, it is possible that errors may occur at the reception side as a result.

SUMMARY OF THE INVENTION

It is an object of the invention to solve the above problems and to provide a facsimile apparatus for reading images of original sheets in which both-side and one-side original sheets exist mixedly and transmitting them to a receiver station, including reading means for reading the images on both sides of the original sheet, discrimination means for discriminating whether the images on both sides read by the reading means have effective image information or not, and control means adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination of the discriminating means, and for transmitting to the receiver station both-side transmission control information including a page number and information regarding front or reverse side of the original sheet, for each side of the original sheet, when the both-side transmitting procedure is used, and omitting the transmission of the both-side transmission control information, so that the page number is not transmitted to the receiver station, when the one-side transmitting procedure is used.

It is a further object of the invention to provide a facsimile apparatus for reading images of original sheets in which both-side and one-side original sheets exist mixedly and transmitting them to a receiver station, including reading means for reading the images on both sides of the original sheet, means for discriminating whether the images on both sides read by the reading means have effective image information or not; and control means adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination of the discriminating means, and for transmitting to the receiver station a value to be allocated to the front side when it is assumed that the one-side original sheet is the both-side original sheet, as a page number of the one-side original sheet, in case the one-side transmitting procedure is used.

It is yet another objection of the invention to provide a control method of a facsimile apparatus for reading images of original sheets in which both-side and one-side original sheets exist mixedly and transmitting them to a receiver station, including a reading step of reading the images on both sides of the original sheet, a step of discriminating whether the images on both sides read by the reading step have effective image information or not, and a control step adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination in the discriminating step, and for transmitting to the receiver station both-side transmission control information including a page number and information regarding front or reverse side of the original sheet, for each side of the original sheet, when the both-side transmitting procedure is used, and omitting the transmission of the both-side transmission control information, so that the page number is not transmitted to the receiver station, when the one-side transmitting procedure is used.

It is still another object of the invention to provide a control method of a facsimile apparatus for reading images of original sheets in which both-side and one-side original sheets exist mixedly and transmitting them to a receiver station, including a reading step of reading the images on both sides of the original sheet, a step of discriminating whether the images on both sides read by the reading step have effective image information or not, and a control step adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination in the discriminating step, and for transmitting to the receiver station a value to be allocated to the front side when it is assumed that the one-side original sheet is the both-side original sheet, as a page number of the one-side original sheet, in case the one-side transmitting procedure is used.

It is another object of the invention to provide a storage medium readable by a computer, storing a control program of a facsimile apparatus for reading images of original sheets in which both-side and one-side original sheets exist mixedly and transmitting them to a receiver station, the control program including a reading step of reading the images on both sides of the original sheet, a step of discriminating whether the images on both sides read by the reading step have effective image information or not, and a control step adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination in the discriminating step, and for transmitting to the receiver station both-side transmission control information including a page number and information regarding front or reverse side of the original sheet, for each side of the original sheet, when the both-side transmitting procedure is used, and omitting the transmission of the both-side transmission control information, so that the page number is not transmitted to the receiver station, when the one-side transmitting procedure is used.

It is a further object of the invention to provide a storage medium readable by a computer, storing a control program of a facsimile apparatus for reading images of original sheets in which both-side and one-side original sheets exist mixedly and transmitting them to a receiver station, the control program including a reading step of reading the images on both sides of the original sheet, a step of discriminating whether the images on both sides read by the reading step have effective image information or not, and a control step adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination in the discriminating step, and for transmitting to the receiver station a value to be allocated to the front side when it is assumed that the one-side original sheet is the both-side original sheet, as a page number of the one-side original sheet, in case the one-side transmitting procedure is used.

BRIEF DESCRIPTION OF THE DRAWINGS

FIG. 2 is an explanatory diagram showing FIF of DIS/DTC and DCS signals which are used in a both-side transmission;

FIG. 3 is a diagram showing a table of a format of a post-message signal which is used in both-side transmission;

FIG. 16 is an explanatory diagram showing the construction of an original sheet which is transmitted in a different communication control of a fourth embodiment of the invention;

DETAILED DESCRIPTION OF THE PREFERRED EMBODIMENTS

First Embodiment

Figure 1:
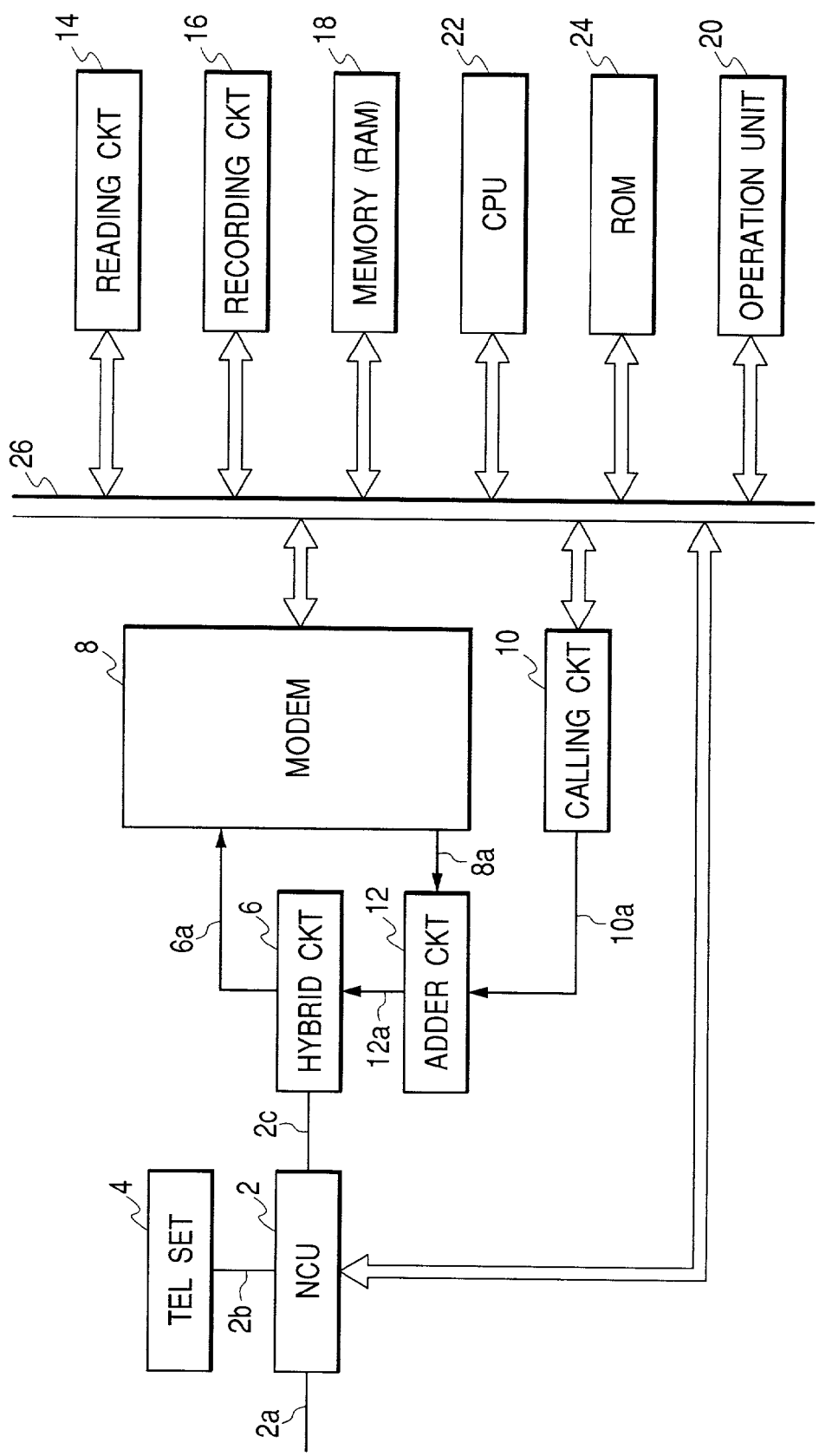
FIG. 1 is a block diagram showing a hardware construction of a facsimile apparatus using the invention.

The invention will now be described in detail hereinbelow on the basis of the embodiments shown in the drawings. FIG. 1 shows a hardware construction of a facsimile apparatus using the invention.

In FIG. 1, reference numeral 2 denotes an NCU (network control unit). The NCU 2 is connected to a terminal of a line in order to use a telephone network for data communication or the like, makes a connection control of a telephone exchange network, performs switching to a data communication path, and holds a loop. The NCU 2 connects (CML off) a telephone line 2a to a telephone set 4 side and connects (CML on) the telephone line 2a to the facsimile apparatus side by a control from a bus 26. In a normal state, the telephone line 2a is connected to the telephone set 4 side.

Reference numeral 6 denotes a hybrid circuit for separating a signal of a transmission system and a signal of a reception system, sending a transmission signal from an adder circuit 12 to the telephone line 2a via the NCU 2, receiving a signal from a partner side via the NCU 2, and sending it to a modem 8 via a signal line 6a.

The modem 8 performs a modulation and a demodulation based on the ITU-T recommendation V.8, V.21, V.27ter, V.29, V.17, and V.34. Each transmitting mode of the modem is designated by the control from the bus 26. The modem 8 receives a transmission signal from the bus 26, outputs modulation data to a signal line 8a, receives a reception signal outputted to the signal line 6a, and outputs demodulation data to the bus 26.

Reference numeral 10 denotes a calling circuit for receiving phone number information from the bus 26 and outputs a selection signal of DTMF to a signal line 10a.

Reference numeral 12 denotes the adder circuit for mixing the transmission signal. The adder circuit receives information on the signal line 8a and information on the signal line 10a and outputs an addition result to a signal line 12a.

Reference numeral 14 denotes a reading circuit comprising an original sheet conveying system, an optical reading device, and the like. The reading circuit outputs image data read from the original sheet to the bus 26. In this embodiment, it is assumed that the reading circuit 14 can read image information on the front and reverse sides of the original sheet by a method wherein a user reverses the original sheet to set the same, a method wherein the original sheet is reversed by a built-in original sheet reversing mechanism, or the like.

Reference numeral 16 denotes a recording circuit constructed on the basis of a predetermined recording system such as electrophotographic system, ink-jet system, thermal sensitive system, or the like. The recording circuit 16 sequentially records the image information outputted onto the bus 26 line by line. In this embodiment, it is assumed that the recording circuit 16 can record images onto both of the front and reverse sides of a recording paper by using recording elements provided for both sides of the recording paper, a recording paper reversing mechanism, or the like.

In this specification, the term "recording paper" is used to refer to a medium which is successively subjected to the recording by the recording circuit 16. However, it is not always necessary that the material of the "recording paper" is "paper", and other materials such as a plastic sheet or the like can be used.

Reference numeral 18 denotes a memory constructed by a RAM or the like. The memory circuit 18 comprises an arbitrary memory device such as ROM, RAM, hard disk, or the like and is used to store various data. That is, the memory circuit 18 is used as a work memory (RAM) or used to further store raw (unprocessed) read data, encoded information, received information, or decoded information or the like through the bus 26.

Reference numeral 20 denotes an operation unit. Particularly, one-touch dial keys, abbreviation dial keys, a ten-key array, * and # keys, a start key, a stop key, a set key, a selection key to read both-side original sheet information, and other function keys are provided for a keyboard portion of the operation unit 20. Depression information of those keys, indicating when, and which, key(s) are depressed, is outputted to the bus 26.

The operation unit 20 has a display unit. The display unit receives and displays the information outputted to the bus 26. The display unit is used for various monitor displays, warning displays, and the like.

Reference numeral 22 denotes a CPU (central processing unit) for controlling the whole apparatus and executing a facsimile transmission control procedure. A control program for such procedure has been stored in a ROM 24.

An outline of a communicating procedure for both-side transmission of a two-side original sheet will now be described with reference to FIGS. 2 to 7. A general both-side transmission disclosed in the tentative plan of the ITU-T recommendation T.30 proposed at present is shown here.

Two modes, such as alternate mode (both-side alternate transmitting mode) and continuous mode (both-side continuous transmitting mode) exist as communicating modes for both-side transmission. The former is a mode for alternately transmitting the front side and the reverse side for each original sheet, in the order: the front side of the first page, the reverse side thereof, the front side of the second page, the reverse side thereof, etc. The latter mode is a mode for first sequentially transmitting all of the front sides of the original sheets in page order, that is, in the order: the front side of the first page, the front side of the second page, etc., and thereafter, sequentially transmitting all of the reverse sides of the original sheets in page order, that is, in order: the reverse side of the first page, the reverse side of the second page, etc. The facsimile apparatus can effect facsimile communication by using either of those two modes.

A construction of information to designate the both-side transmission in an FIF (facsimile information field) of each of a DIS (digital identification, which is transmitted from an image receiving station) signal, a DTC (digital transmission command, which is transmitted from an image transmitting station) signal, and a DCS (digital command, which is transmitted from the image transmitting station) signal is shown as a table in FIG. 2.

As shown in FIG. 2, in the DIS/DTC signals, the presence or absence of a both-side recording function in the alternate mode is shown by bit x (this bit number is not determined formally but is identified as "x" for convenience of explanation) of the FIF, and the presence or absence of a both-side recording function in the continuous mode is shown by bit x+1 of the FIF. In the DCS signal, the both-side transmission in the alternate mode is shown by bit x of the FIF and the both-side transmission in the continuous mode is shown by bit x+1 of the FIF.

FIG. 3 shows a frame construction of a Q signal (specifically speaking, an EOP (end of page) signal, an MPS (multi-page) signal, an EOM (end of message) signal, or the like) in a normal G3 transmission and a PPS-Q signal (specifically speaking, a post-message signal such as PPS-EOP, PPS-MPS, PPS-EOM, PPS-NULL, or the like) in an ECM (error correcting mode) transmission.

As shown in FIG. 3, in such post-message signal, facsimile information is transmitted following Flag (flag), Address (address), Control (control data), and FCF (facsimile control field). In the head of the facsimile information, three fields i.e. PC (page counter), BC (block counter) and FC (frame counter), are transmitted only in the case of the ECM. After that, the facsimile information regarding the both-side transmission are transmitted. The facsimile information regarding the both-side transmission comprises Length (length, one octet; the sum of data lengths, which is represented in units of octets of data in Page number and Page information as explained hereinbelow), Page number (page number, two octets), and Page information (page information). After that, FCS (frame check sequence) and Flag (flag) are transmitted.

Among them, the Page number (page number) is added page by page in accordance with the rules when the both-side original sheet is transmitted in page order (the front side and the reverse side, alternately). The Page information (page information) has a data width of one octet and indicates whether the image information on the side is that on the front side or the reverse side. The front side (0) or the reverse side (1) is expressed by bit 0. Bits 1 to 6 are reservation bits and their functions are not defined. Bit 7 is always set to 0 as an extension bit.

In the facsimile information of the post-message signal mentioned above, the three fields Length, Page number, and Page information are newly added for both-side transmission.

Figure 4:
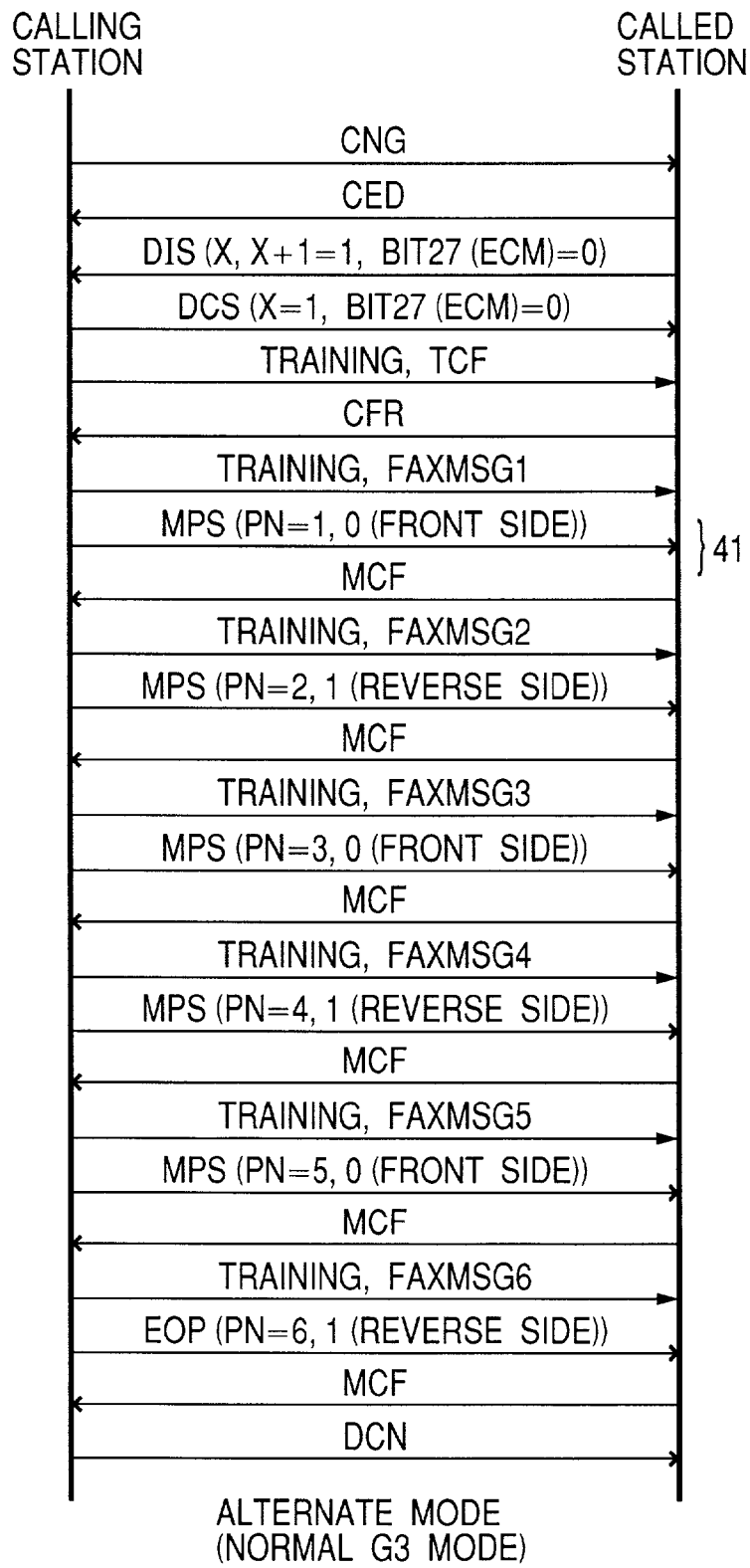
FIG. 4 is an explanatory diagram showing both-side transmission in an alternate mode, in a normal G3 mode.
Figure 5:
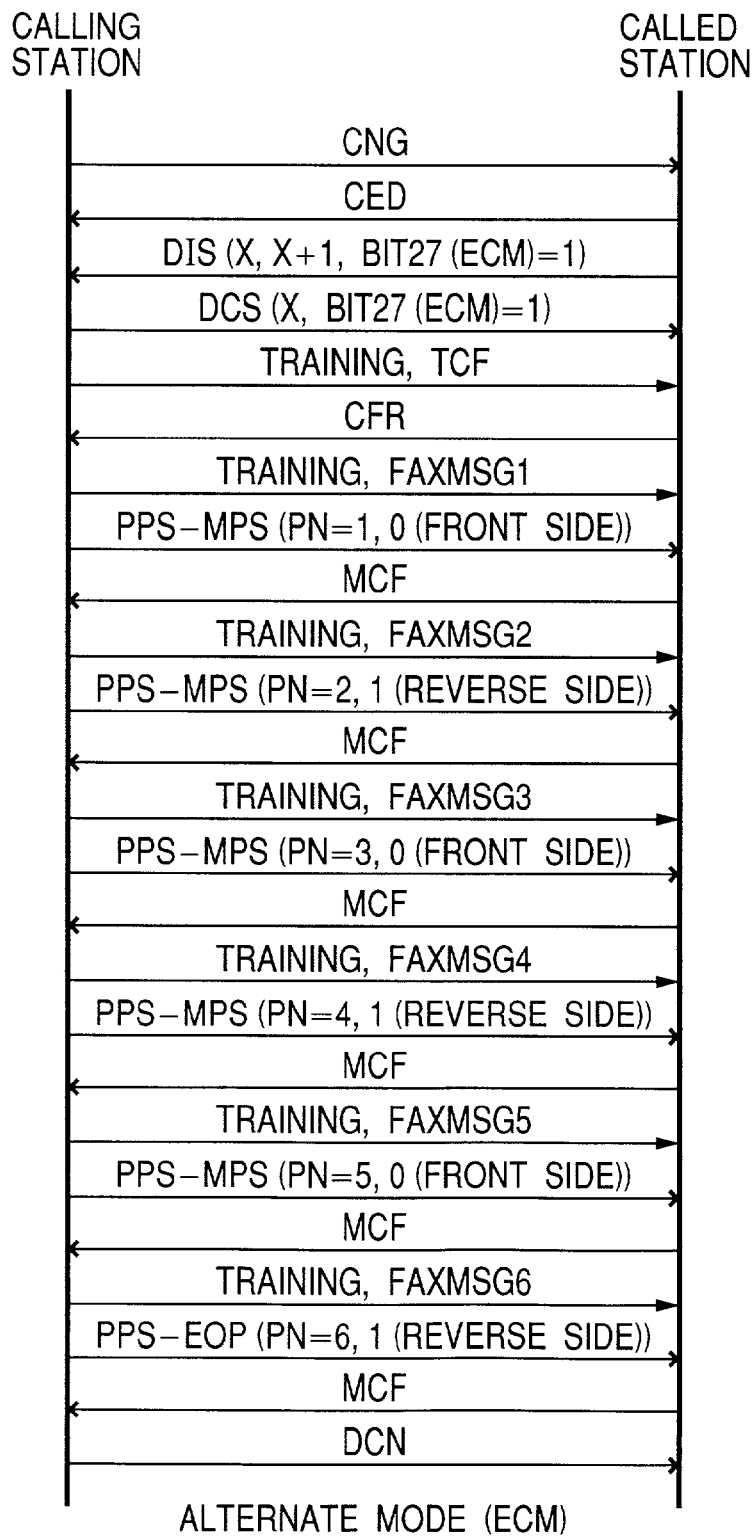
FIG. 5 is an explanatory diagram showing both-side transmission in the alternate mode, in an ECM communicating mode.
Figure 6:
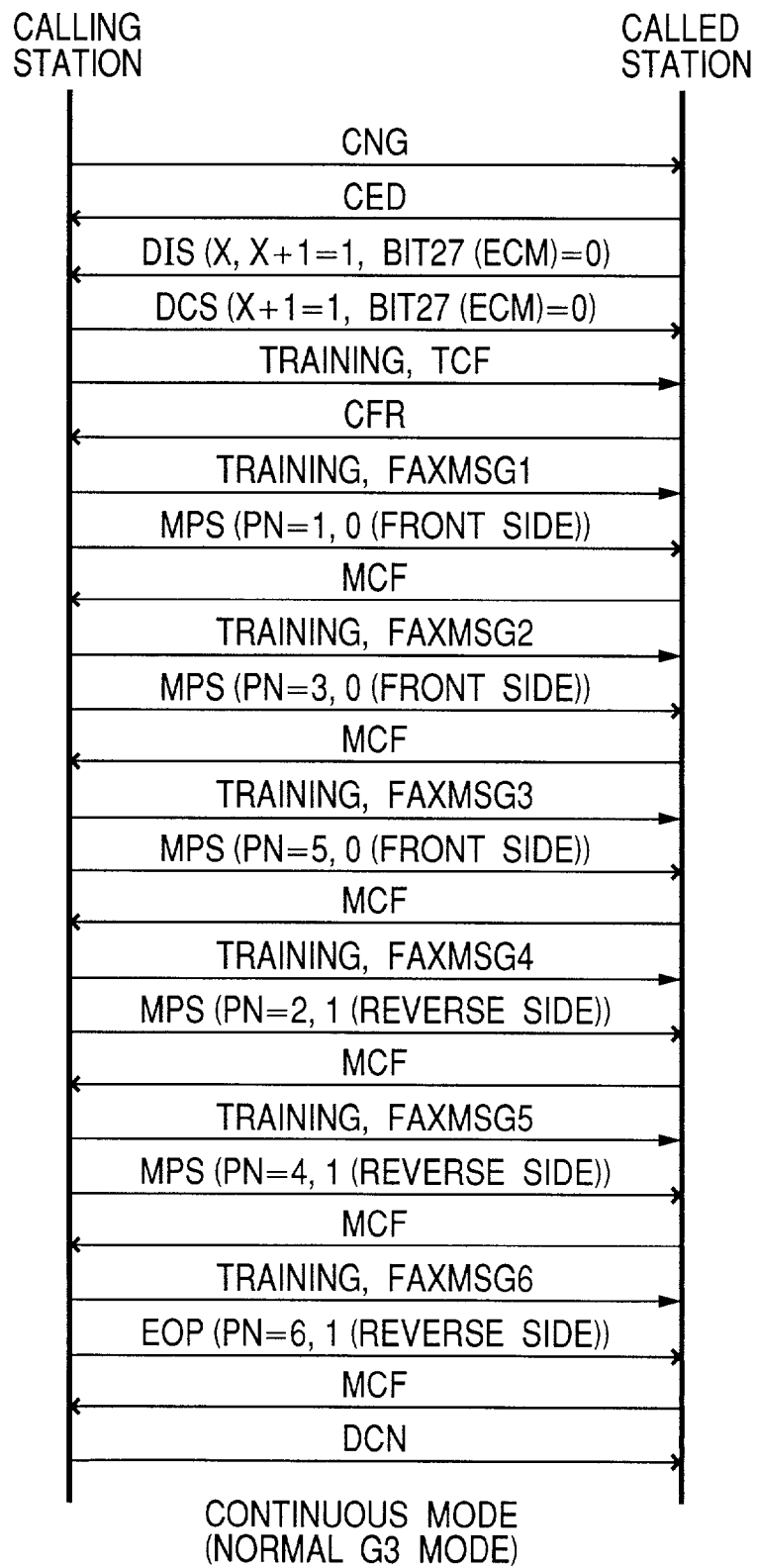
FIG. 6 is an explanatory diagram showing both-side transmission in a continuous mode, in the normal G3 mode.
Figure 7:
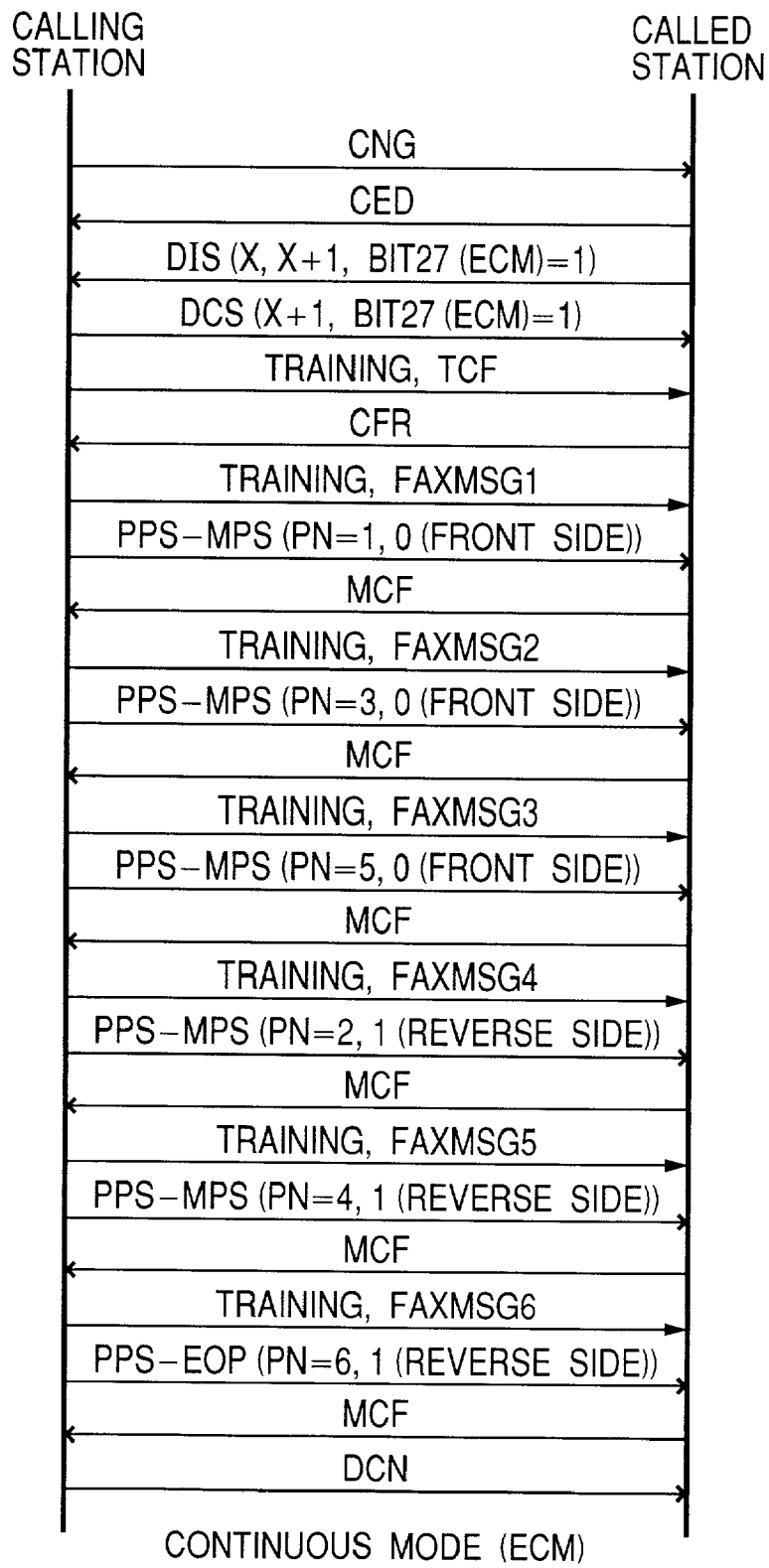
FIG. 7 is an explanatory diagram showing both-side transmission in the continuous mode, in the ECM communicating mode.

FIG. 4 shows the state of the both-side transmission in the alternate mode in the normal G3 mode. FIG. 5 shows the state of the both-side transmission in the alternate mode in the ECM communicating mode. FIG. 6 shows the state of the both-side transmission in the continuous mode in the normal G3 mode. FIG. 7 shows the state of the both-side transmission in the continuous mode in the ECM communicating mode.

As shown in FIGS. 4 to 7, the both-side transmitting function (both the alternate mode and the continuous mode are possible) of the receiver (called station) is shown by bits x and x+1 of the DIS signal. The both-side transmitting mode to be executed by the transmitter (calling station) from now on is declared by bits x and x+1 of the DCS signal. In the continuous mode in FIGS. 6 and 7, it is declared that the transmission in the continuous mode is executed by setting bit x+1 of the DCS signal to "1".

As shown in FIGS. 4 and 6, although the post-message signal is transmitted following image messages (FAXMSG 1 to 6), in the case of the normal mode, the MPS signal is used as a post-message signal. As shown in FIGS. 5 and 7, in case of the ECM, the PPS-MPS signal is used.

Three both-side original sheets are transmitted here. "PN" in each diagram indicates the Page Number mentioned above.

For example, the MPS signal shown at 41 in FIG. 4 (alternate mode) is shown as "MPS (PN=1, 0 (front side))". It means that the image information of the page No. 1 (PN=1) and the front side (0 (front side)) has been transmitted (the expression of the MPS or PPS-MPS signal in FIG. 4 and subsequent diagrams is similar to that mentioned above).

That is, in the alternate mode in FIGS. 4 and 5, the image information of the original sheet is sequentially transmitted in order of the front side (0) of the first page (PN=1), the reverse side (1) of the first page (PN=2), the front side (0) of the second page (PN=3), the reverse side (1) of the second page (PN=4), the front side (0) of the third page (PN=5), and the reverse side (1) of the third page (PN=6).

In the continuous mode in FIGS. 6 and 7, the image information of the original sheet is sequentially transmitted in the order: the front side (0) of the first page (PN=1), the front side (0) of the second page (PN=3), the front side (0) of the third page (PN=5), the reverse side (1) of the first page (PN=2), the reverse side (1) of the second page (PN=4), and the reverse side (1) of the third page (PN=6).

The general both-side procedure has been shown above. In the present embodiment, whether effective image information exists on both sides of the original sheet or not is discriminated. If image information exists only on one side, the procedure is switched from the both-side transmitting procedure to the one-side transmitting procedure. That is, in the both-side transmission control information of the post-message signal mentioned above, the three fields of Length (data length), Page number (page number), and Page information (information about the front or reverse side of the original sheet) are not transmitted.

That is, in the present embodiment, the following communication control is made by the CPU 22. In the transmission of two-side original sheets, if an original with only one side of information is included with originals have two sides of information, the both-side transmitting procedure and the one-side transmitting procedure are selectively switched between by a mode change. However, the page number included in the post-message signal is counted as being effective only for the page information of the two-side original sheet. As for the transmitting mode of the two-side original sheet information, the transmission of the two-side original sheet information in the alternate mode is considered. The above control is stored as a program for the CPU 22 in the ROM 24.

FIGS. 8 to 12 show flowcharts for the flow of the foregoing communication control. Recurrence of the same numerals in FIGS. 8 to 12 indicates points at which the flows go continuously from one Fig. to another.

Figure 8:
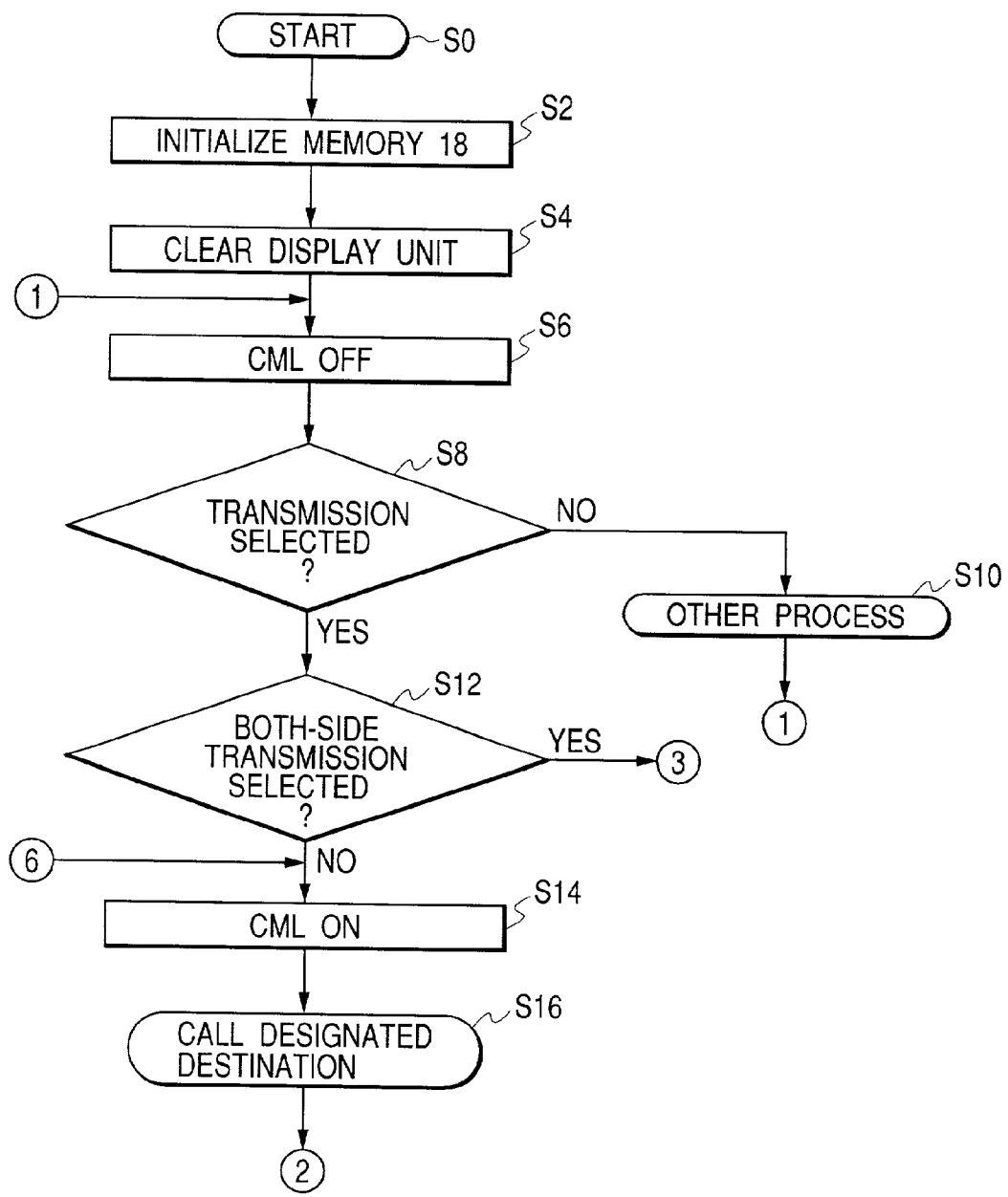
FIG. 8 is a flowchart showing communication control of a CPU 22 in FIG. 1.

In FIG. 8, step S0 shows the beginning of a process which is started by a predetermined resetting operation or the like.

An initializing process is executed in steps S2 and S4. In step S2, the memory 18 is initialized through the bus 26. In step S4, the display unit of the operation unit is cleared through the bus 26. An event loop which handles actual communicating processes is started from step S6.

In step S6, the CML of the NCU 2 is turned off through the bus 26 and the line 2a is connected to the telephone set 4 side.

In step S8, whether the transmission has been selected or not is discriminated. The transmission is executed in accordance with a predetermined operation in the operation unit (not shown) or at a time counted by a timer (not shown) in case of the timer communication. That is, whether the transmission has been selected or not is discriminated in step S8. If it is selected, step S12 follows. If NO, step S10 follows and another process (copy or the like of the original sheet) is executed. After that, the processing routine is returned to step S6.

In the case of transmission, in step S12, the information of the operation unit 20 is inputted through the bus 26 and whether transmission of two-side original sheets has been selected or not is discriminated. If transmission of two-side original sheets is selected, step S24 (FIG. 9B) follows. If transmission of two-side original sheets is not selected, step S14 follows.

Step S14 and subsequent steps show one-side transmitting processes. First, in step S14, the CML of the NCU 2 is turned on through the bus 26 and the line 2a is connected to the facsimile apparatus (hybrid circuit 6) side.

In step S16, a designated destination is called by using the calling circuit 10 through the bus 26. Subsequently, in step S18 in FIG. 9A, the facsimile communication pre-procedure is executed. In this case, both of bits x and x+1 of the DCS signal are set to "0" and the both-side communication is not designated.

In step S20, only the one-sides of the original sheet information are transmitted in page order. In step S22, a facsimile communication post-procedure is executed. After that, the processing routine is returned to step S6.

Figure 9A:
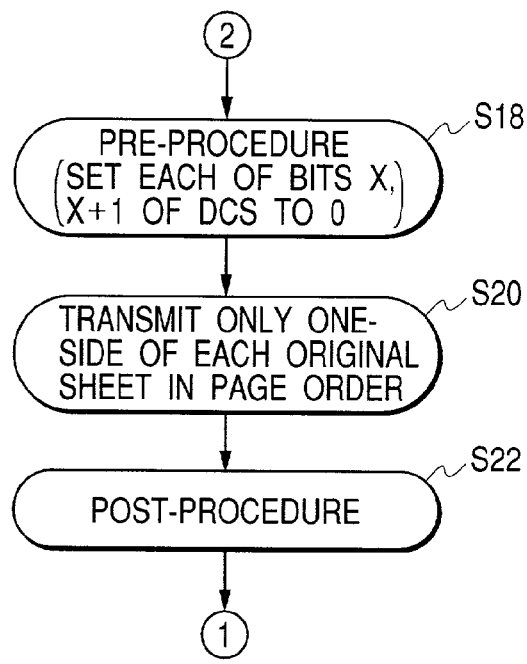
FIGS. 9A and 9B are flowcharts showing the communication control of the CPU 22 in FIG. 1.
Figure 9B:
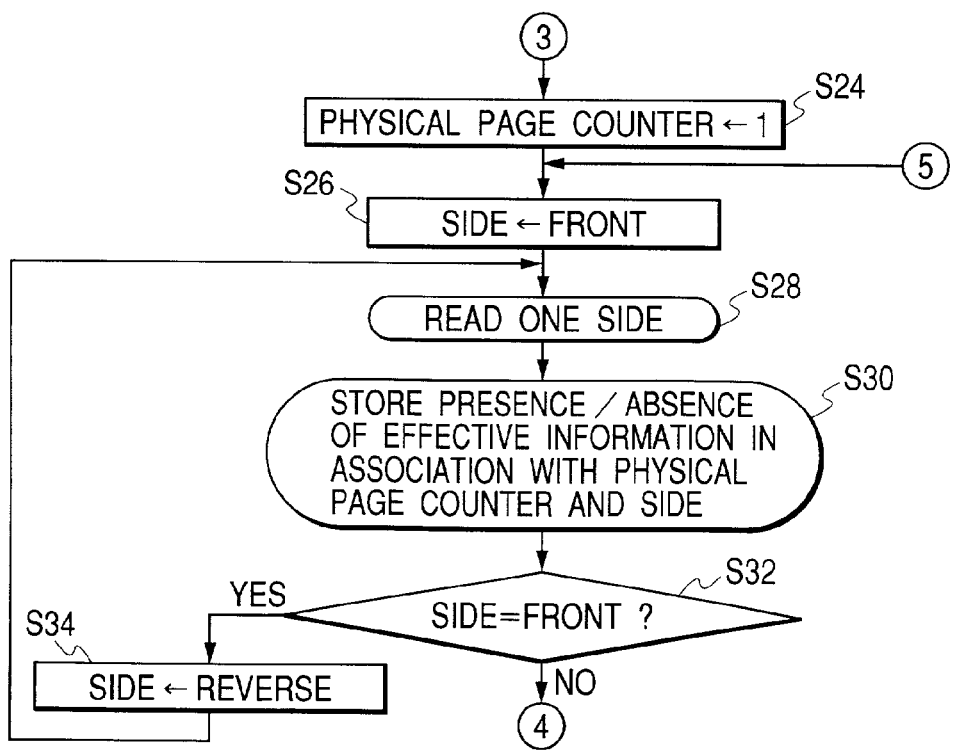

In the case of two-side transmission, in step S24 in FIG. 9B, a physical page counter is set to "1". Unlike the both-side procedure specified in the foregoing recommendation, the physical page counter is incremented every original sheet (refer to step S38 in FIG. 10).

In step S26, the front is set into a side flag indicative of the front or reverse side of the original sheet under processing.

In step S28, one side of the front or reverse side of the original sheet is read by the reading circuit 14 and stored in an image memory area in the memory 18.

In step S30, information indicative of the presence or absence of the effective image information on the side which was read now is stored into a predetermined area in the memory 18 in association with the physical page counter and the side.

The detection of the effective image information can be performed by such a method that, for example, if the side is entirely white state (or the occupation ratio of black dots is equal to or less than a predetermined percentage or the like), it is determined that there is no effective image information, or the like. Although this is the simplest method, it is also possible to make a stricter discrimination by adding proper detecting conditions in order to detect more effective image information.

In step S32, whether the side under processing at present is the front side or not is discriminated by checking the side flag. If YES, step S34 follows and the reverse side is set into the side flag. After that, the processing routine is returned to step S28. If NO, step S36 in FIG. 10 follows.

Figure 10:
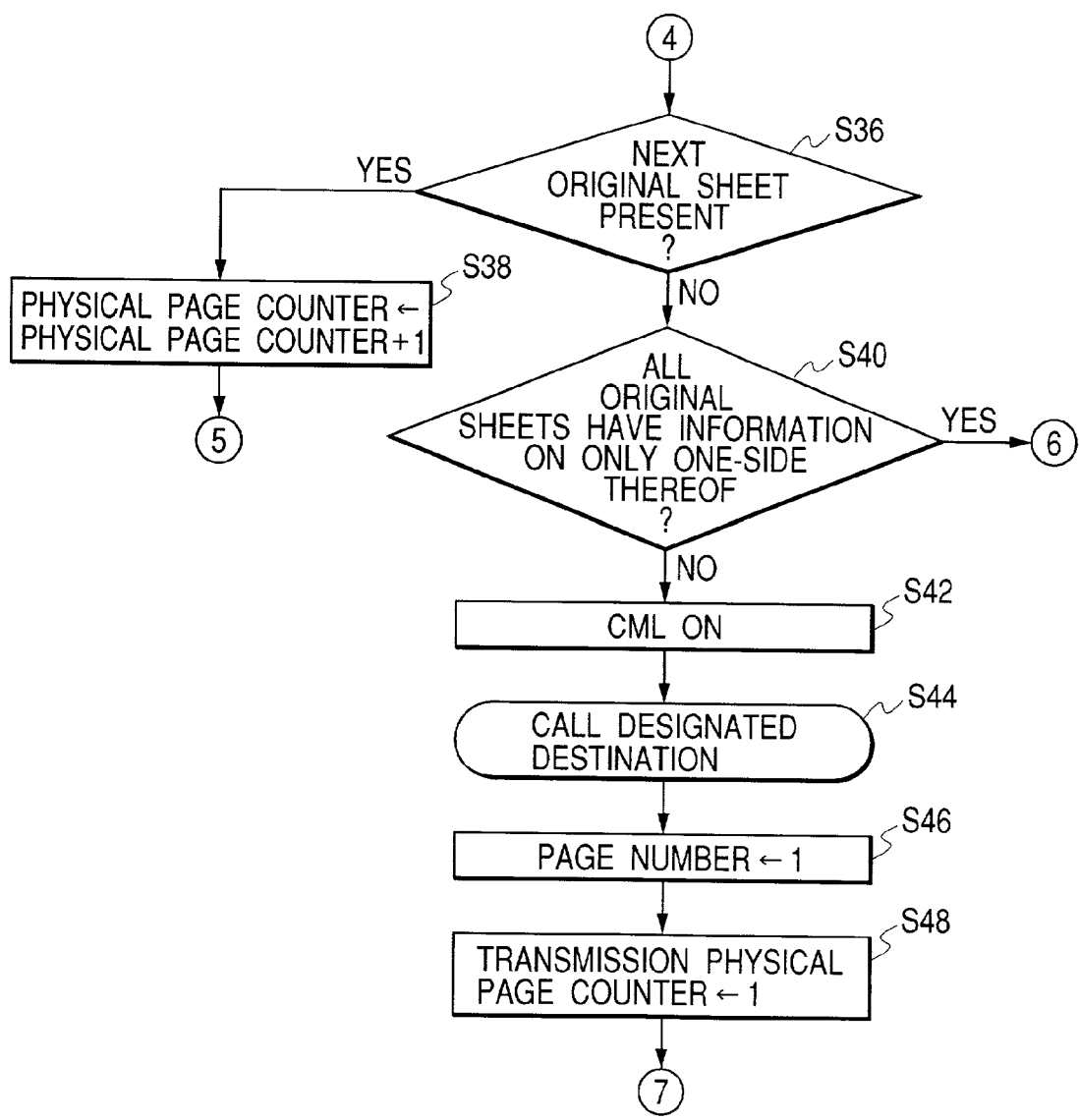
FIG. 10 is a flowchart showing the communication control of the CPU 22 in FIG. 1.

In step S36 in FIG. 10, the presence or absence of a following original sheet is discriminated. If there is not the next original sheet, step S40 follows. If there is another original sheet, step S38 follows and a count value of the physical page counter is increased by "1". After that, the processing routine is returned to step S26 (FIG. 9B). As mentioned above, one side of each of the front and reverse sides of the original sheet is read by a single loop in steps S26 to S30.

In step S40, the presence or absence of the effective information stored in step S30 is referred to with respect to each of the front and reverse sides of each physical page, and whether all of the original sheets have only one side bearing information or not is discriminated. If YES, step S14 in FIG. 8 follows and the foregoing one-side transmitting process is executed.

If NO in step S40, that is, if effective information exists on the reverse side of the original sheet with respect to at least one side, step S42 follows.

In step S42, the CML of the NCU 2 is turned on through the bus 26 and the line 2a is connected to the facsimile apparatus side.

In step S44, the designated destination is called by using the calling circuit 10 through the bus 26.

In step S46, "1" is set into the page number (counter allocated into a predetermined area in the memory 18). The page number is the same as the number to be transmitted to the receiver station on the basis of the rules of the foregoing recommendation.

Further, in step S48, "1" is set into a transmission physical page counter. This counter is a counter that is independent of the counter used upon reading mentioned above. This counter is increased by "1" every original sheet (step S62 in FIG. 11, step S82 in FIG. 12).

Figure 11:
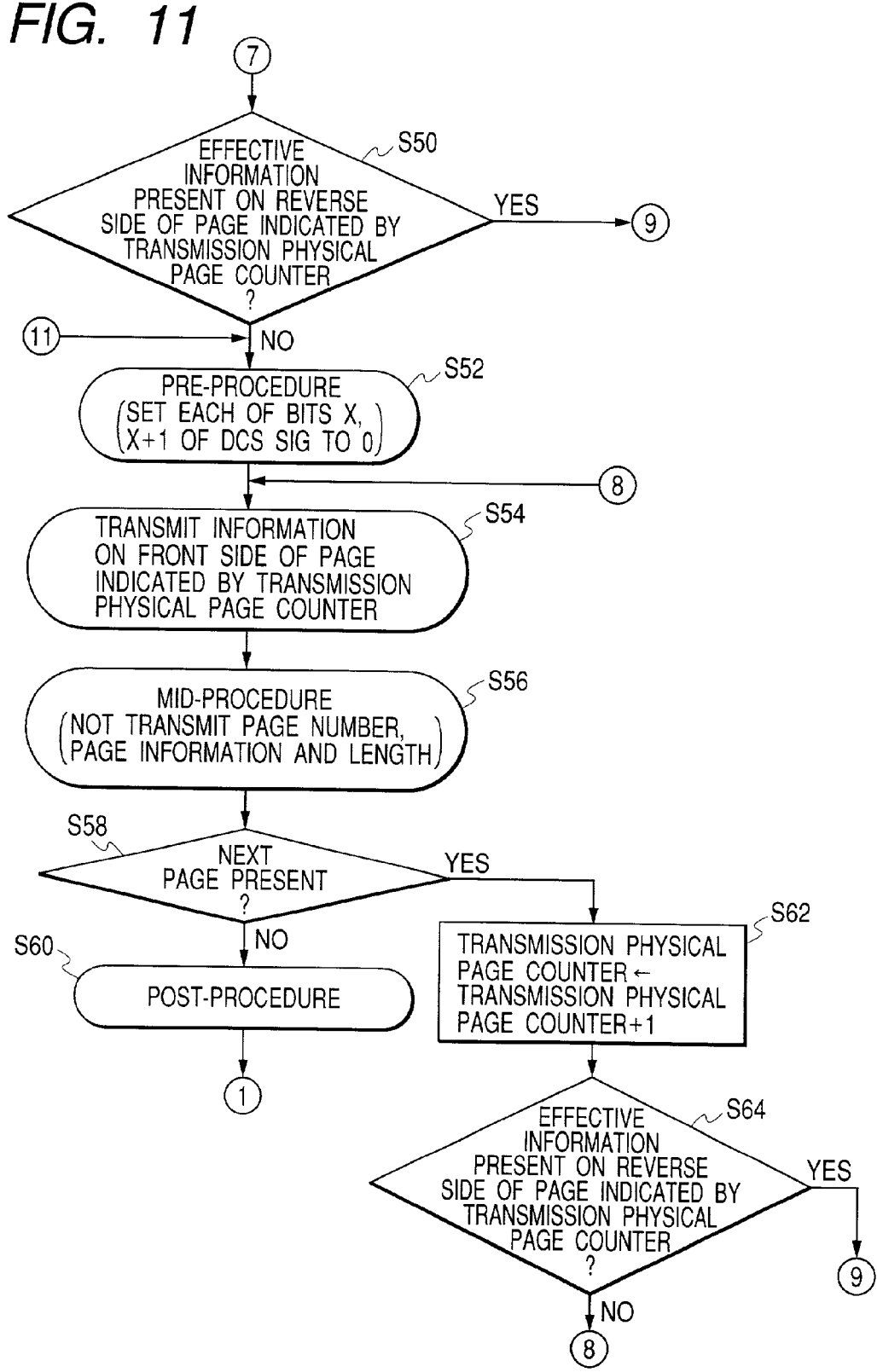
FIG. 11 is a flowchart showing the communication control of the CPU 22 in FIG. 1.

In step S50 in FIG. 11, whether effective information to be transmitted exists on the reverse side of the page shown by the transmission physical page counter or not is discriminated referring to the presence or absence of the effective information stored in step S30. If YES, step S66 in FIG. 12 follows. If NO, step S52 follows.

Step S52 and subsequent steps in FIG. 11 relate to processes in a case where effective information to be transmitted does not exist on the reverse side of the page shown by the transmission physical page counter. In step S52, a facsimile communication pre-procedure is first executed. Both of bits x and x+1 of the DCS signal are set to "0" and the both-side transmission is not designated.

In step S54, the image information on the front side of the page shown by the transmission physical page counter is one-side transmitted.

In step S56, a facsimile communication mid-procedure is executed. The control information regarding the both-side transmission of each of Page number, Page information, and Length (refer to FIG. 3) is not transmitted here.

In step S58, the presence or absence of a following page is discriminated. If there is another page, step S62 follows and the transmission physical page counter is increased by "1". If there is no next page, step S60 follows and the facsimile communication post-procedure is executed.

In step S64, whether page information of the transmission physical page counter also exists on the reverse side or not is discriminated. If YES, step S66 in FIG. 12 follows. If NO, step S54 follows.

Figure 12:
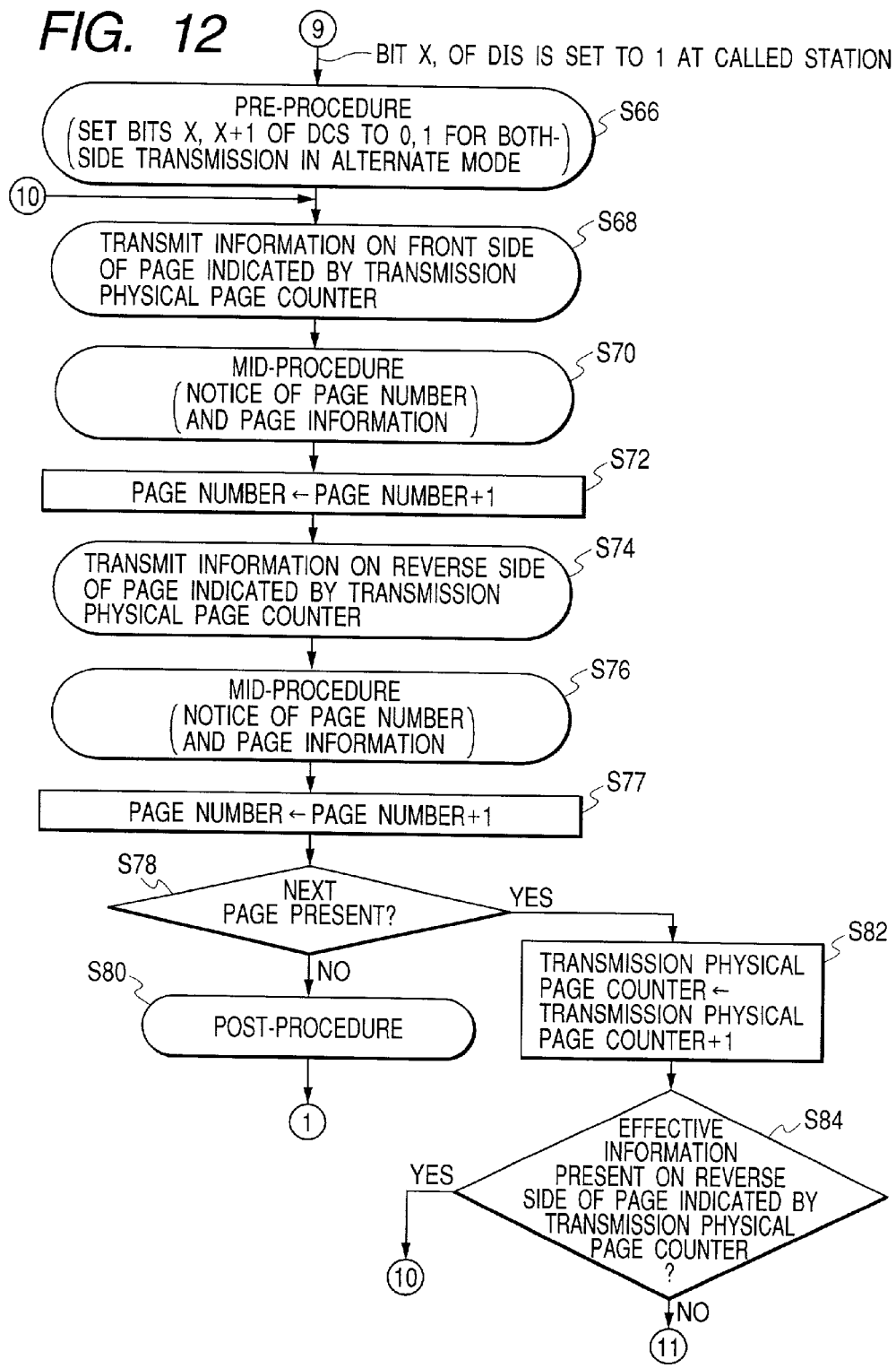
FIG. 12 is a flowchart showing the communication control of the CPU 22 in FIG. 1.

If effective information to be transmitted exists on the reverse side of the page shown by the transmission physical page counter in step S50, step S66 in FIG. 12 follows and the both-side transmitting process is executed.

In step S66, the facsimile communication pre-procedure is first executed. Bit x of the DCS signal is set to "1", bit x+1 is set to "0" here, and both-side transmission in the alternate mode is designated.

In step S66, it is assumed that the receiver station declares that it has the both-side receiving function in the alternate mode by setting bit x of the DIS signal to "1", for simplicity of explanation here. However, if the receiver station declares that it does not have the both-side receiving function, the information on all of the original sheet sides may be one-side transmitted by using the one-side transmitting procedure in steps S14 to S22.

In step S68, the image information on the front side of the page shown by the transmission physical page counter is transmitted.

In step S70, the facsimile mid-procedure is executed. In this case, the page number (the initial setting is executed in step S46) is transmitted by the post-message signal (MPS signal in case of the normal mode, PPS-MPS signal in case of the ECM), and at the same time, the front side (=0) is transmitted as page information.

In step S72, the value of Page number is increased by "1". The processing routine advances to the process of the reverse side in step S74. In step S74, the image information on the reverse side shown by the transmission physical page counter is transmitted.

In step S76, the mid-procedure is executed. In this case, Page number is transmitted by the post-message signal and, at the same time, the reverse side (=1) is transmitted as page information.

In step S77, the value of Page number is increased by "1" and step S78 follows.

In step S78, the presence or absence of a following page is discriminated. If there is a next page, step S82 follows and the count value of the transmission physical page counter is increased by "1". If there is no next page, the facsimile communication post-procedure is executed in step S80. The processing routine is returned to step S6.

In step S84, the presence or absence of effective information on the reverse side of the page shown by the transmission physical page counter is discriminated. If effective information exists, the processing routine is returned to step S68 and the above processes are repeated. If it does not exist in step S84, step S52 in FIG. 11 follows and the image information on the relevant side is transmitted by the one-side transmitting process mentioned above.

As mentioned above, according to this embodiment, when both-side transmission is selected, the both-side transmitting procedure and the one-side transmitting procedure are selectively switched between in accordance with whether effective image information is included on both sides of the original sheet or not. If effective image information does not exist on both sides, a one-side procedure, which is simpler, is executed with respect to the relevant side(s), thereby making it possible to prevent the both-side transmission control information such as Page number, Page information, Length, etc., from being transmitted. Consequently, a collection of original sheets that includes both sheet(s) on which image information is present on both sides and sheet(s) having information on only one side exist mixedly can be efficiently transmitted in a short transmitting time.

Since no Page number is transmitted with respect to the pages having only one-side of information, which were one-side transmitted, if Page number and Page information regarding the front and reverse sides of the post-message are used for header printing or the like on the reception side, since those items of information are not printed onto the side which was one-side transmitted, the recording paper which was one-side transmitted and the recording paper which was both-side transmitted can be easily distinguished by the user.

In the above control example, in steps S64 and S84, only when the processing routine enters the image transmitting process of the front side of the next original sheet, a discrimination is made as to whether the relevant page has a reverse side or not. That is, in the control example, it is presumed that effective image information certainly exists on the front side. However, naturally, in steps S64 and S84, by discriminating the presence or absence of effective image information on both sides, the processing routine can also be branched to the processes in step S68 and subsequent steps or the processes in step S52 and subsequent steps. If effective image information exists only on the reverse side, in the processes in step S52 and subsequent steps, only the effective image information on the reverse side is one-side transmitted.

Second Embodiment

In the first embodiment, the both-side procedure has been used in the case where effective information exists on at least one of the reverse sides. However, if the amount of one-side information which is present in the whole set of original sheets is very small, even if one-side transmission is executed with respect to that information, the communicating time which can be saved is also very small. Therefore, if the number of one-side pages is small, for example, the number of one-side original sheets included in the both-side original sheet information is equal to or less than a predetermined number, all pages can alternatively be transmitted as both-side original sheet information by the both-side procedure.

Figure 13:
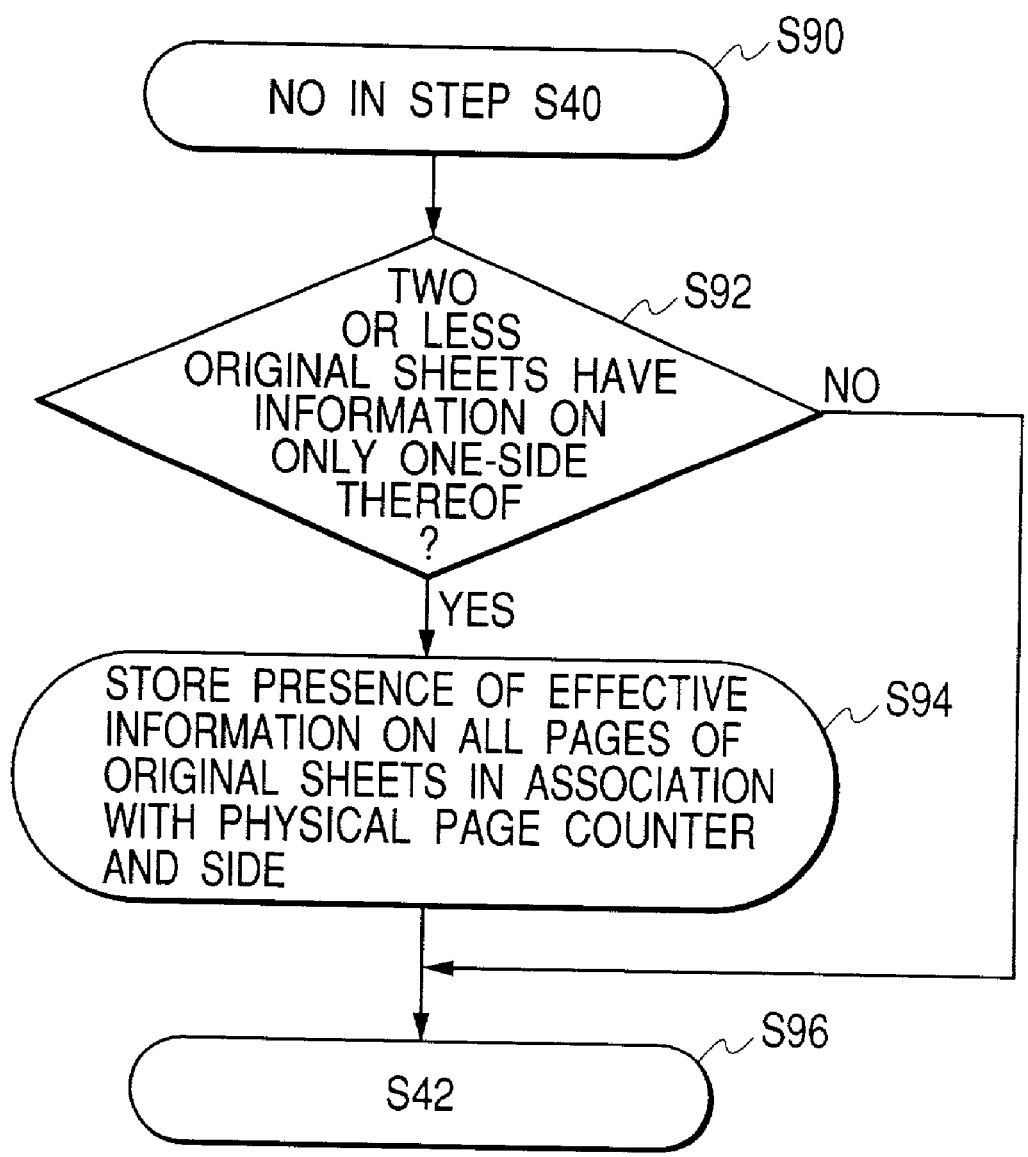
FIG. 13 is a flowchart showing a different communication control (second embodiment) according to the invention.

FIG. 13 shows changed portions necessary for the control in FIGS. 8 to 12 in order to make the control as mentioned above.

In FIG. 13, step S90 corresponds to a branch of NO in step S40 in FIG. 10, and step S96 corresponds to step S42. That is, processes in FIG. 13 are added between steps S40 and S42 in FIG. 10.

In step S92, whether the number of original sheets having only the one-side information in the read information is equal to or less than 2 or not is discriminated. If the number of original sheets having only the one-side information is equal to or less than 2, step S94 follows. Information indicative of the presence of effective information regarding all of the original sheet information is stored into the memory 18 in association with the count value of the physical page counter and the side. If the number counted is larger than 2, step S96 (step S42) follows.

As mentioned above, when the number of one-side original sheets is small, the information of all sides can be both-side transmitted and the burden on the control processing can be reduced.

If Page number of the post-message is used for header printing or communication management on the reception side, if the original sheets having effective image information only on one-side are one-side transmitted and Page number of the post-message is omitted, as shown in the first embodiment, the recording paper which was one-side transmitted and the recording paper which was both-side transmitted can be easily distinguished by the user. On the contrary, however, there is a fear that a processing mistake, such as loss of recording paper or the like, may occur on the reception side. However, in the second embodiment, such a processing mistake can also be prevented.

Although whether the number of one-side original sheets is equal to or less than 2 or not is discriminated in step S92, the threshold value of this number of original sheets used in this decision can be set arbitrarily. In step S92, another discriminating reference can be used. For example, whether the number of one-side original sheets is equal to or less than a predetermined percentage of the whole number of original sheets or not can also be discriminated.

Third Embodiment

In the first embodiment, a both-side original sheet is transmitted in the both-side mode, a one-side original sheet is transmitted in the one-side mode, and when both-side original sheet(s) and one-side original sheet(s) exist mixedly, mode change is performed between the both-side transmitting mode and the one-side transmitting mode in accordance with whether each original sheet is a both-side original sheet or a one-side original sheet, and the reception side is notified of the page number by the transmission side, using a procedure signal, only in the both-side mode. Further, when the mode is switched from the both-side mode to the one-side mode and the mode is then again changed to the both-side mode, the reception side is notified of the page numbers so that the page numbers are continuous as between the two periods of use of the both-side mode.

However, as shown in the third embodiment, although the reception side is notified of the page numbers from the transmission side by a procedure signal only in the both-side mode in a manner similar to the first embodiment, the page number can be also reset each time the mode is changed.

Figure 14:
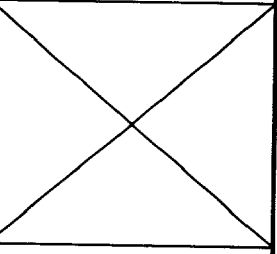
FIG. 14 is an explanatory diagram showing the construction of an original sheet which is transmitted in yet another communication control (third embodiment) according to the invention.

For example, as shown in FIG. 14, when a total of three original sheets, in which the first and third original sheets are both-side original sheets and the second original sheet is a one-side original sheet, are transmitted, as Page number, the page number PN=1 for the front side and the page number PN=2 for the reverse side are transmitted by the post-message signal in the case of the both-side original sheet as the first original sheet, and no page number is transmitted in the case of the one-side original sheet as the second original sheet. When the third original sheet is transmitted again by a both-side protocol, Page number is reset and the page number PN=1 for the front side and the page number PN=2 for the reverse side are transmitted by the post-message signal.

Figure 15:
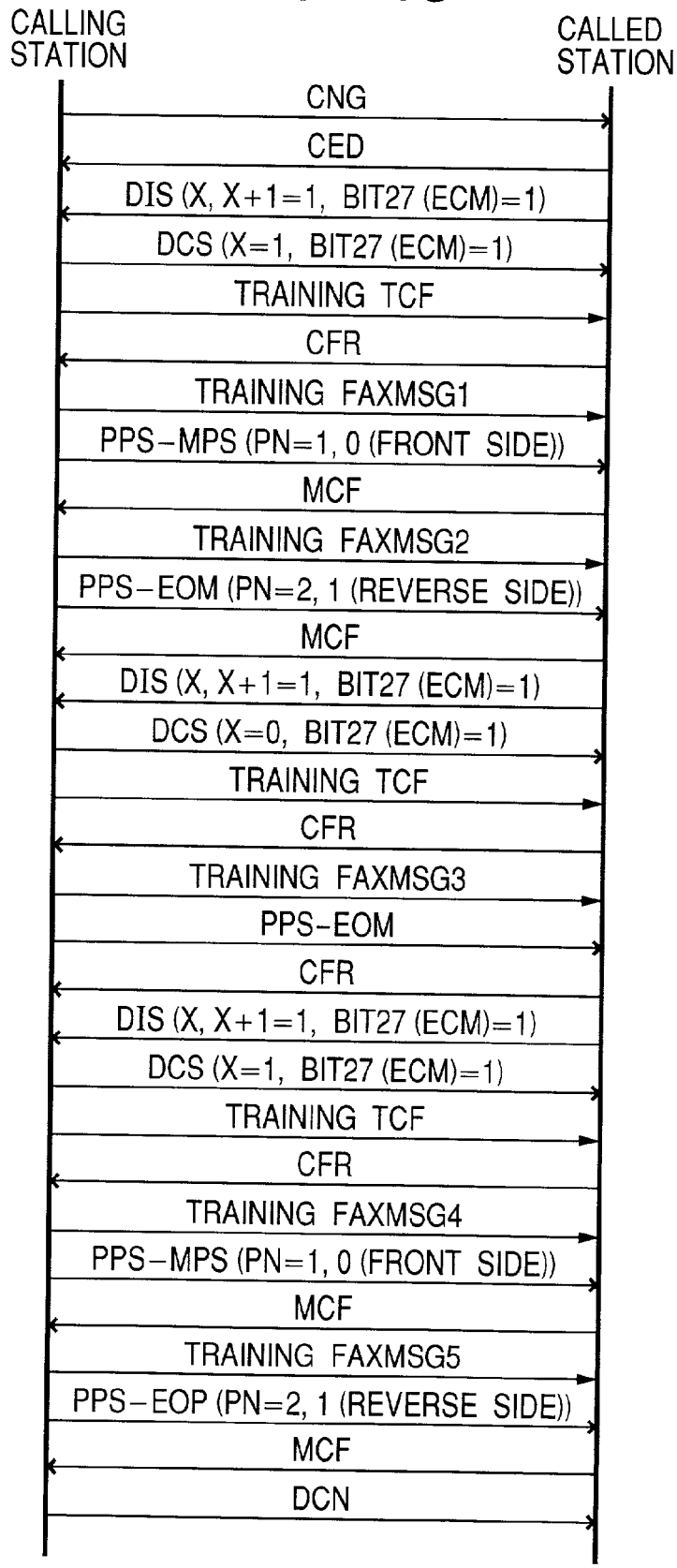
FIG. 15 is an explanatory diagram showing image transmission in the communication control of the third embodiment of the invention.

FIG. 15 shows transmission and reception of signals when the original sheet is transmitted in FIG. 14. In FIG. 15, although the ECM communication in the alternate mode is used, naturally, a similar control can be also made by using a non-ECM mode.

In FIG. 15, the page numbers PN=1 and PN=2 and information (0 or 1) showing whether each image message relates to the front side or the reverse side are transmitted by the PPS-Q signals just after image messages FAXMSG1 (front) and FAXMSG2 (reverse) of the first original sheet.

After the mode change to the one-side, an image message FAXMSG3 of the second original sheet is transmitted.

Further, after the transmission of the image message FAXMSG3 of the second original sheet, the mode is again switched to the both-side mode and image messages FAXMSG4 (front) and FAXMSG5 (reverse) of the third original sheet are transmitted. However, at this time, by resetting Page number, in the PPS-Q just after each image message, the page numbers PN=1 and PN=2 and the information (0 or 1) showing whether each image message relates to the front side or the reverse side are transmitted as Page number in a manner similar to the case of the first original sheet.

To make such a control, in the control procedure (FIGS. 8 to 12) of the first embodiment, it is sufficient to add a process for resetting the count value of the page counter to "1" to step S66 in FIG. 12. The other processes are similar to those in the first embodiment mentioned above.

As mentioned above, by determining the procedure so as to start the count-up operation of the page number after it is reset each time the both-side transmitting mode is newly started and constructing the receiver station so as to operate on the basis of such a specification as a prerequisite, the reception side can operate without error and the mixed set of original sheets in which the one-side original and the both-side original exist mixedly can be certainly and efficiently communicated by using both of the one-side transmitting mode and the both-side transmitting mode.

Fourth Embodiment

In the third embodiment, the count-up operation of the page number is started after it is reset each time the both-side transmitting mode is newly started. However, it may be considered that as a page number of the one-side original sheet, the page number is also added to the one-side original sheet and the image data is transmitted. For example, assuming the one-side original sheet is the both-side original sheet, the value to be allocated to the front side is transmitted to the receiver station.

In the fourth embodiment, although the processes in the both-side mode are substantially the same as those in the first embodiment, it differs from the first embodiment with respect to a point that the page number corresponding to the front side is notified even in the one-side mode.

For example, as shown in FIG. 16, when a total of three original sheets, in which the first and third original sheets are both-side original sheets and the second original sheet is a one-side original, are transmitted, as Page number, the page number PN=1 for the front side and the page number PN=2 for the reverse side are transmitted by the post-message signal in the case of the both-side original sheet being the first original sheet, and in the case of the one-side original sheet being the second original sheet, the page number PN=3 (assuming that the second original sheet is a both-side original sheet, a value to be allocated to the front side thereof) is transmitted as Page number. When the third original sheet is transmitted again by the both-side protocol, the page number PN=5 for the front side and the page number PN=6 for the reverse side are transmitted by the post-message signal.

Figure 17:
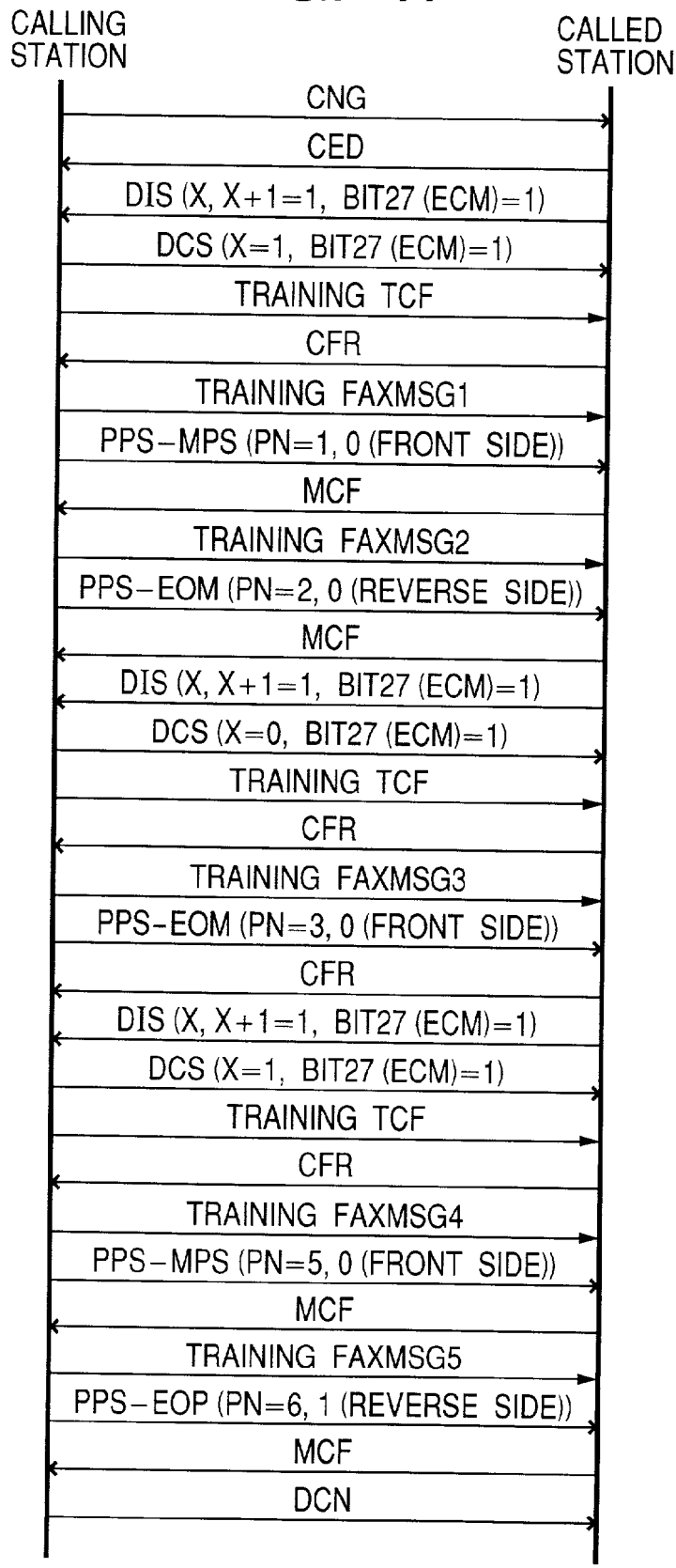
FIG. 17 is an explanatory diagram showing image transmission in the communication control of the fourth embodiment of the invention.

FIG. 17 shows transmission and reception of signals in this instance. Although the ECM communication in the alternate mode is also used in FIG. 17, naturally, a similar control can be also made by using a non-ECM mode.

Although the procedure of FIG. 17 is similar to that of FIG. 15, it differs from FIG. 15 with respect to a point that the page number PN=3 is transmitted as Page number in case of the second original sheet and the page numbers which are transmitted with respect to the third original sheet are set to the page number PN=5 for the front side and the page number PN=6 for the reverse side.

Figure 18:
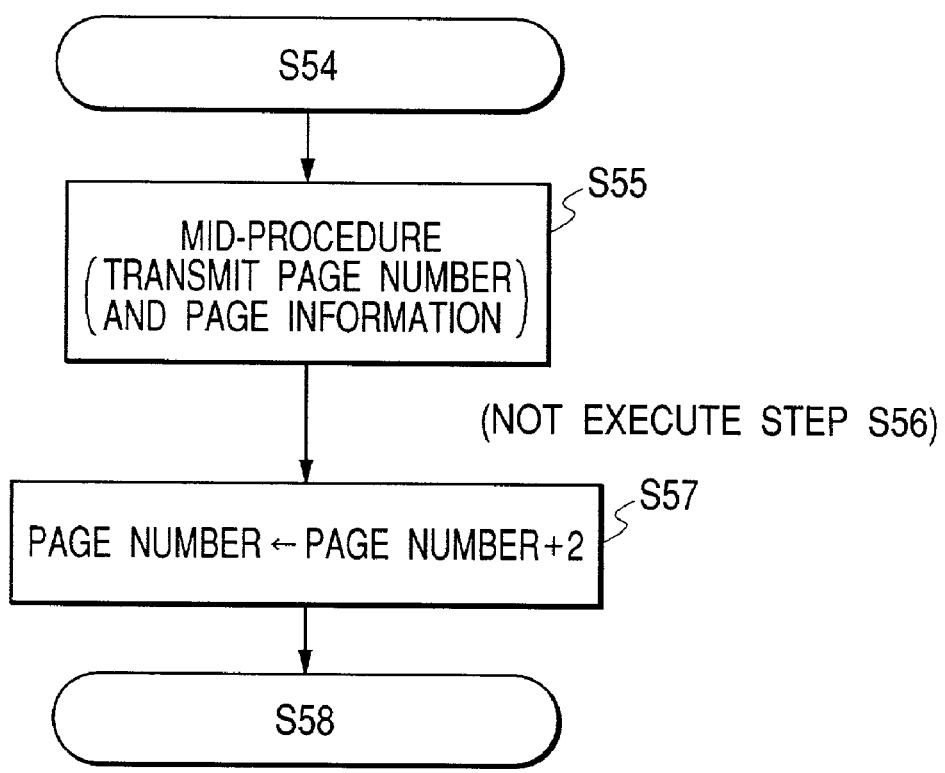
FIG. 18 is a flowchart showing the communication control of the fourth embodiment of the invention.

To make such a control, in the control procedure (FIGS. 8 to 12) in the first embodiment, step S56 in FIG. 11 is deleted and processes shown in FIG. 18 are inserted in place of it.

In the embodiment, after the image message (since the second original sheet in FIG. 16 is one-side of only the front side, it is transmitted here) is transmitted by the one-side procedure in step S54, step S55 is executed.

In step S55, a mid-procedure is executed and Page number (PN=3 in case of the front side of the second original sheet in FIG. 16) and "0" indicative of a front side as Page information, are transmitted. Subsequently, in step S57, "2" is added to the page number and the page number is updated (it is additionally increased by an amount corresponding to the reverse side). Step S58 follows.

As mentioned above, assuming that the one-side original sheet is the both-side original sheet, by determining the procedure in a manner such that the value to be allocated to the front side is transmitted to the receiver as a page number of the one-side original sheet and constructing the receiver station so as to operate on the basis of such a specification as a prerequisite, the reception side can operate without error and the mixed set of original sheets, in which the one-side original sheet(s) and the both-side original sheet(s) exist mixedly, can be certainly and efficiently communicated by using both of the one-side transmitting mode and the both-side transmitting mode.

In the case of the present embodiment, since the post-message signals according to the both-side protocol specification are transmitted even in the one-side protocol, it is necessary to construct the receiver station so that it can particularly cope with such signals. If necessary, therefore, whether such a signal format has been supported or not can be also preliminarily confirmed between the transmitter station and the receiver station in the pre-procedure.

The apparatus can be also constructed in a manner such that the transmitting methods of the page number shown in the third and fourth embodiments can be selected in accordance with the setting operation of the user.

Although the construction of the facsimile dedicated apparatus has been shown above, the invention is not limited to it but can be also embodied to a facsimile apparatus of another form. For example, the invention can be also embodied in a construction such that an FAX modem or the like is externally attached to or built in a general terminal such as a personal computer and facsimile communication is executed by a software control. In this case, a control program of the invention can be stored not only into the foregoing memory 18 but also into any other computer-readable memory medium such as hard disk, floppy disk, optical disk, magnetooptic disk, memory card, or the like and can be supplied therefrom.

As described above, according to the invention, the facsimile apparatus having the both-side transmitting mode for reading images of original sheets in which both-side original sheet and one-side original sheet exist mixedly and transmitting them to the receiver station uses the construction such that the images on both sides of the original sheet are read, whether the read original sheet images have the effective image information on both sides or not is discriminated, in the both-side transmitting mode, each time one sheet of original is transmitted, the mode to use the both-side transmitting procedure and the mode to use the one-side transmitting procedure for transmission of the image information of the relevant side are selectively switched in accordance with the discrimination result. Therefore, in the both-side transmitting mode, the both-side transmitting procedure and the one-side transmitting procedure are selectively switched in accordance with whether the original sheet has the effective image information on both sides or not. When the effective information does not exist on both sides, the one-side procedure, which is simpler, is executed with respect to those sides. Therefore, there is an excellent effect such that the original sheet in which the both-side image information and the one-side image information exist mixedly can be efficiently transmitted in a short transmitting time.

Further, according to the invention, there is used a construction such that the count-up operation of the page number is interrupted when the one-side transmitting mode is executed and it is restarted when the mode is switched to the both-side transmitting mode, a construction such that the count-up operation of the page number is started after it is reset each time the both-side transmitting mode is newly started, or further, a construction such that assuming that the one-side original sheet is the both-side original sheet, the value to be allocated to the front side is transmitted to the receiver station as a page number of the one-side original sheet. In case of reading and transmitting the images of the original sheets in which the both-side original and the one-side original exist mixedly, the procedure for notifying the reception side of the page number from the transmission side is determined. Therefore, there are excellent effects such that the reception side can operate without error and the mixture original in which the one-side original and the both-side original exist mixedly can be certainly and efficiently communicated by using both of the one-side transmitting mode and the both-side transmitting mode.

What is claimed is:

1. A facsimile apparatus for reading images of original sheets in which both-side and one-side original sheets exist mixedly and transmitting them to a receiver station, comprising:

reading means for reading the images on both sides of the original sheet;

discriminating means for discriminating whether the images on both sides read by said reading means have effective image information or not; and control means adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination of said discriminating means; and for transmitting to the receiver station both-side transmission control information including a page number and information regarding front or reverse side of the original sheet, for each side of the original sheet, when said both-side transmitting procedure is used, and omitting the transmission of the both-side transmission control information, so that when the one-side transmitting procedure is used, the page number is not transmitted to the receiver station, and when the both-side transmitting procedure is used, the page number is transmitted to the receiver station.

2. An apparatus according to claim 1, wherein a count-up operation of the page number is executed only with respect to the both-side original sheet of which images on both sides have the effective image information.

3. An apparatus according to claim 2, wherein the count-up operation of the page number is started after it is reset each time the both-side transmitting procedure is newly started.

4. A facsimile apparatus for reading images of original sheets in which both-side and one-side original sheets exist mixedly and transmitting them to a receiver station, comprising:

reading means for reading the images on both sides of the original sheet;

means for discriminating whether the images on both sides read by said reading means have effective image information or not; and control means adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination of said discriminating means, and for transmitting to the receiver station a value to be allocated to the front side when it is assumed that the one-side original sheet is the both-side original sheet, as a page number of the one-side original sheet, in case said one-side transmitting procedure is used.

5. A control method of a facsimile apparatus for reading images of original sheets in which both-side and one-side original sheets exist mixedly and transmitting them to a receiver station, comprising:

a reading step of reading the images on both sides of the original sheet;

a step of discriminating whether the images on both sides read by said reading step have effective image information or not; and a control step adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination in said discriminating step, and for transmitting to the receiver station both-side transmission control information including a page number and information regarding front or reverse side of the original sheet, for each side of the original sheet, when the both-side transmitting procedure is used, and omitting the transmission of said both-side transmission control information, so that when the one-side transmitting procedure is used, the page number is not transmitted to the receiver station, and when the both-side transmitting procedure is used, the page number is transmitted to the receiver station.

6. A method according to claim 5, wherein a count-up operation of the page number is executed only with respect to the both-side original sheet of which images on both sides have the effective image information.

7. A method according to claim 6, wherein the count-up operation of the page number is started after it is reset each time the both-side transmitting mode is newly started.

8. A control method of a facsimile apparatus for reading images of original sheets in which both-side and one-side original sheets exist mixedly and transmitting them to a receiver station, comprising:
  a reading step of reading the images on both sides of the original sheet;
  a step of discriminating whether the images on both sides read by said reading step have effective image information or not; and
  a control step adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination in said discriminating step, and for transmitting to the receiver station a value to be allocated to the front side when it is assumed that the one-side original sheet is the both-side original sheet, as a page number of the one-side original sheet, in case said one-side transmitting procedure is used.

9. A storage medium readable by a computer, storing a control program of a facsimile apparatus for reading images of original sheets in which both-side and one-side original sheets exist mixedly and transmitting them to a receiver station, said control program comprising:
  a reading step of reading the images on both sides of the original sheet;
  a step of discriminating whether the images on both sides read by said reading step have effective image information or not; and
  a control step adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination in said discriminating step, and for transmitting to the receiver station both-side transmission control information including a page number and information regarding front or reverse side of the original sheet, for each side of the original sheet, when the both-side transmitting procedure is used, and omitting the transmission of said both-side transmission control information, so that when the one-side transmitting procedure is used, the page number is not transmitted to the receiver station, and when the both-side transmitting procedure is used, the page number is transmitted to the receiver station.

10. A storage medium readable by a computer, storing a control program of a facsimile apparatus, according to claim 9, wherein in said control step, a count-up operation of the page number is executed only with respect to the both-side original sheet of which images on both sides have the effective image information.

11. A storage medium readable by a computer, storing a control program of a facsimile apparatus, according to claim 10, wherein in said control step, the count-up operation of the page number is started after it is reset each time the both-side transmitting mode is newly started.

12. A storage medium readable by a computer, storing a control program of a facsimile apparatus for reading images of original sheets in which both-side and one-side original sheets exist mixedly and transmitting them to a receiver station, said control program comprising:
  a reading step of reading the images on both sides of the original sheet;
  a step of discriminating whether the images on both sides read by said reading step have effective image information or not; and
  a control step adapted for selectively determining use of a both-side transmitting procedure if both sides of the original sheet have effective image information or use of a one-side transmitting procedure if both sides of the original sheet do not have effective image information, for each transmission of one original sheet, in accordance with a result of the discrimination in said discriminating step, and for transmitting to the receiver station a value to be allocated to the front side when it is assumed that the one-side original sheet is the both-side original sheet, as a page number of the one-side original sheet, in case said one-side transmitting procedure is used.

* * * * *

UNITED STATES PATENT AND TRADEMARK OFFICE
CERTIFICATE OF CORRECTION

PATENT NO. : 7,151,616 B2  Page 1 of 1
APPLICATION NO. : 09/884064
DATED : December 19, 2006
INVENTOR(S) : Takehiro Yoshida It is certified that error appears in the above-identified patent and that said Letters Patent is hereby corrected as shown below:

ON COVER PAGE AT (56) FOREIGN PATENT DOCUMENTS

"11017877 A" should read --11-017877 A--..

COLUMN 1

Line 62, "one sides" should read --one side--; and
Line 63, "present," should read --is present,--.

COLUMN 9

Line 43, "one side" should read --one-side--.

COLUMN 11

Line 28, "one-side" should read --one side--.

Signed and Sealed this

Eighteenth Day of March, 2008

JON W. DUDAS
*Director of the United States Patent and Trademark Office*